(12) United States Patent
Ortona et al.

(10) Patent No.: US 11,851,377 B2
(45) Date of Patent: Dec. 26, 2023

(54) METHOD FOR PRODUCING A CMC-COMPONENT

(71) Applicant: Sepitec Foundation, Vaduz (LI)

(72) Inventors: Alberto Ortona, Breganzona (CH); Albert Maria Vodermayer, Dietlikon (CH); Giovanni Bianchi, Monte Carasso (CH); Martin Zakovsky, Grabs (CH)

(73) Assignee: SEPITEC FOUNDATION, Vaduz (LI)

( * ) Notice: Subject to any disclaimer, the term of this patent is extended or adjusted under 35 U.S.C. 154(b) by 747 days.

(21) Appl. No.: 16/970,872

(22) PCT Filed: Feb. 11, 2019

(86) PCT No.: PCT/EP2019/053297
§ 371 (c)(1),
(2) Date: Aug. 18, 2020

(87) PCT Pub. No.: WO2019/162126
PCT Pub. Date: Aug. 29, 2019

(65) Prior Publication Data
US 2020/0392045 A1 Dec. 17, 2020

(30) Foreign Application Priority Data
Feb. 23, 2018 (EP) .................................... 18158253

(51) Int. Cl.
*C04B 35/626* (2006.01)
*C04B 35/622* (2006.01)
(Continued)

(52) U.S. Cl.
CPC .... *C04B 35/6267* (2013.01); *C04B 35/62281* (2013.01); *C04B 35/62868* (2013.01);
(Continued)

(58) Field of Classification Search
CPC .......... C04B 35/6267; C04B 35/62281; C04B 35/62868; C04B 35/80; C04B 2235/6021;
(Continued)

(56) References Cited

U.S. PATENT DOCUMENTS

| 4,937,032 A | 6/1990 | Krone et al. |
| 5,080,547 A | 1/1992 | Moghe |

(Continued)

FOREIGN PATENT DOCUMENTS

| CN | 106673662 A | 5/2017 |
| DE | 44 45 305 C1 | 9/1996 |

(Continued)

OTHER PUBLICATIONS

Reichert, F. et al., "Influence of the carbonization temperature on the mechanical properties of thermoplastic polymer derived C/C-SiC composites" Journal of the European Ceramic Society, Feb. 2017 vol. 37, No. 2, pp. 523-529.

*Primary Examiner* — Noah S Wiese
(74) *Attorney, Agent, or Firm* — BROWDY AND NEIMARK, P.L.L.C.

(57) ABSTRACT

A method is proposed for producing a CMC-component (6) comprising at least the steps of pyrolizing (2) a green body (1; 10) made of a fiber (15)-reinforced thermoplastic material (14) and infiltrating (4) the pyrolized green body by a liquid carbide forming substance (31). The fibers (15) of the green body (1; 10) are arranged in one or several strands (16), each of these strands (16) having a main extension direction. The lengths of the fibers (15) of each strand (16) are larger than the overall length (L) of the green body (1; 10) along the main extension direction of this strand (16).

16 Claims, 3 Drawing Sheets

Figure 1:
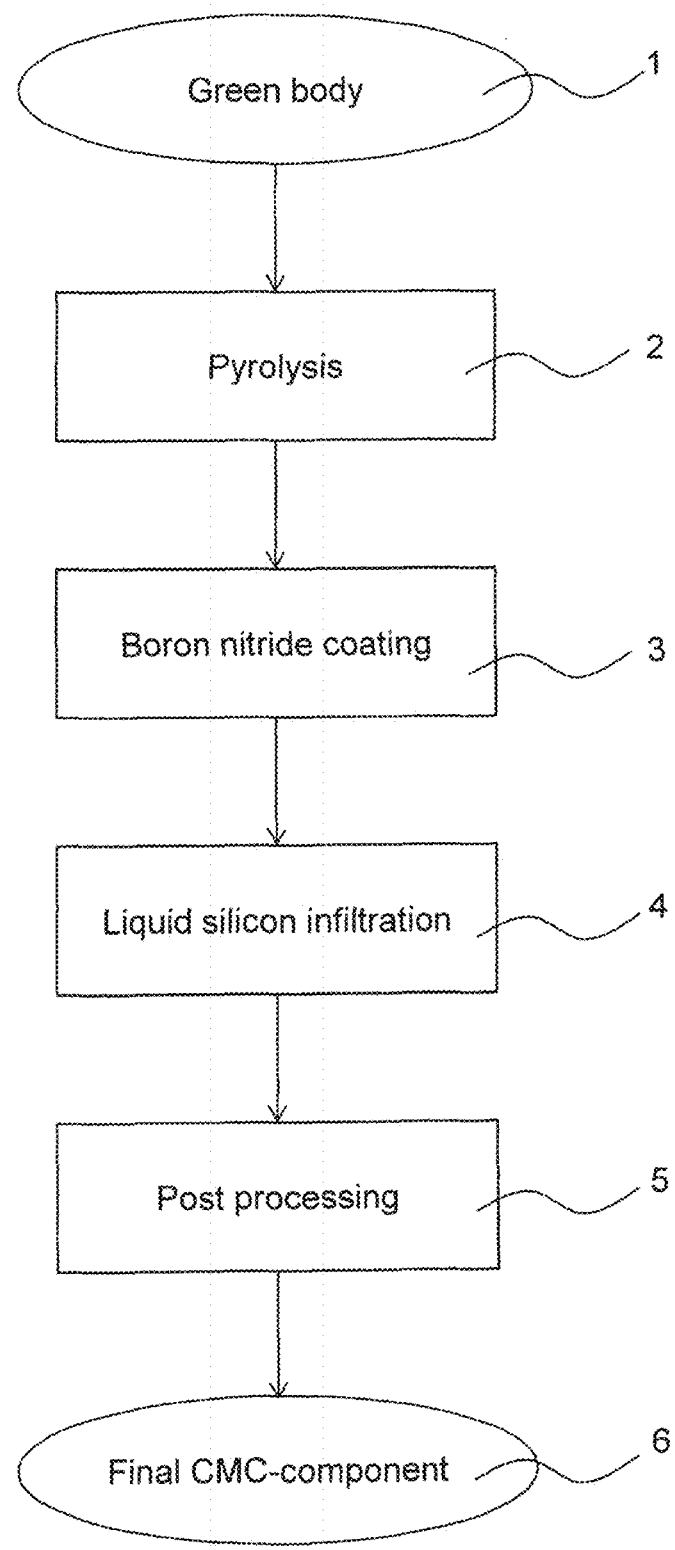

(51) Int. Cl.
*C04B 35/628* (2006.01)
*F01D 5/28* (2006.01)

(52) U.S. Cl.
CPC ...... *F01D 5/284* (2013.01); *C04B 2235/6021* (2013.01); *C04B 2235/612* (2013.01)

(58) Field of Classification Search
CPC ...... C04B 2235/612; C04B 2235/5248; C04B 2235/5268; C04B 2235/616; C04B 2235/94
See application file for complete search history.

(56) References Cited

U.S. PATENT DOCUMENTS

| | | | |
|---|---|---|---|
| 6,013,226 A | 1/2000 | Steel et al. | |
| 6,024,898 A | 2/2000 | Steibel et al. | |
| 6,576,330 B1 | 6/2003 | Schenck et al. | |
| 7,169,465 B1 * | 1/2007 | Karandikar | B82Y 30/00 428/312.8 |
| 2003/0044593 A1 | 3/2003 | Vaidyanathan et al. | |
| 2003/0057590 A1 * | 3/2003 | Loher | B29D 1/005 264/157 |
| 2004/0127600 A1 | 7/2004 | Bauer et al. | |
| 2005/0244581 A1 | 11/2005 | Thebault | |
| 2006/0013222 A1 | 1/2006 | Rangan et al. | |
| 2006/0068150 A1 | 3/2006 | Martin et al. | |
| 2009/0239434 A1 * | 9/2009 | Benitsch | C04B 35/83 428/408 |
| 2012/0076927 A1 | 3/2012 | Bhatt et al. | |
| 2013/0136890 A1 | 5/2013 | Maliszewski et al. | |

FOREIGN PATENT DOCUMENTS

| | | | | |
|---|---|---|---|---|
| DE | 19957906 A1 | 6/2001 | | |
| DE | 10164231 A1 | 7/2003 | | |
| DE | 102014200510 A1 | 7/2014 | | |
| EP | 1340733 A2 | 9/2003 | | |
| EP | 3159321 A1 * | 4/2017 | ............ | B28B 3/025 |
| JP | 2004-2144 A | 1/2004 | | |
| JP | 2005-320236 A | 11/2005 | | |
| JP | 2006-501409 A | 1/2006 | | |
| JP | 2006-118111 A | 5/2006 | | |
| JP | 2014-185066 A | 10/2014 | | |
| WO | 9723431 A1 | 7/1997 | | |
| WO | WO-9723431 A1 * | 7/1997 | ......... | C04B 35/5607 |

* cited by examiner

METHOD FOR PRODUCING A CMC-COMPONENT

TECHNICAL FIELD

The present invention concerns a method for producing a ceramic matrix composite (CMC)-component as well as a CMC-component produced according to such a method. CMC-materials consist of fibers embedded in a ceramic matrix and are usable in a large variety of technical fields and in particular in medical technology, aerospace and power station development.

PRIOR ART

Fiber reinforced ceramic materials, also referred to as ceramic matrix composite (CMC)-materials, are used in a large variety of applications and technical fields. CMC-materials combine the advantages of ceramic materials with the resistance of fibers with regard to mechanical or thermo-mechanical loads, in order to create materials with new and superior properties. The primary goal of reinforcing the ceramic material by means of fibers is to provide structural robustness to the otherwise brittle ceramic material. CMC-materials have unique properties, such as high-temperature stability, high thermal shock resistance, high hardness, high corrosion resistance, lightweight and versatility in providing unique engineering solutions. The combination of these characteristics makes ceramic matrix composites attractive alternatives to traditional processing industrial materials such as super alloys and refractory metals.

There are several differing ways to produce CMC-materials. One commonly applied way is the pyrolysis of a polymer containing fibers. The highly porous matrix obtained after the pyrolysis is then infiltrated with liquid silicon, in order to react to silicon carbide.

In DE 199 57 906, the production of a fiber reinforced composite article is disclosed, in which a fiber reinforced plastic material is pyrolized.

DE 10 2014 200 510 discloses a method for producing ceramic composite materials, in which a fiber reinforced thermoplastic material is injection molded in granulated form, in order to form a green body for subsequent pyrolysis and conversion to the final CMC-component. Due to the granulated form of the fiber reinforced thermoplastic material, only a limited structural robustness of the final product can be achieved using this method.

DE 101 64 231 proposes the production of brake discs and clutch plates from a ceramic material that is reinforced by short fibers. An electrically conductive, fiber reinforced mass is filled into a pressing mold and subsequently hardened under pressure to a green body. The green body is then carbonized and infiltrated with a liquid metal.

EP 1 340 733 discloses a method for producing ceramic composites having unidirectionally aligned reinforcing fibers. In this method, the reinforcing fibers are first enveloped with a sacrificial polymer and then processed by adding binder resins before being carbonized. Due to the use of the sacrificial polymer, shrinkage of the parallel fibers onto each other can be avoided. The pores of the such carbonized component are then infiltrated with liquid silicon. Due to the unidirectional arrangement of the fibers, high structural robustness can only be achieved with this method for components having a comparatively simple three-dimensional structure with a flat surface.

The article of Reichert, F., A. M. Perez-Mas, D. Barreda, C. Blanco, R. Santamaria, C. Kuttner, A. Fery, N. Langhof, and W. Krenkel entitled *Influence of the carbonization temperature on the mechanical properties of thermoplastic polymer derived C/C-SiC composites* in the Journal of the European Ceramic Society, 2017. 37(2): p. 523-529, the influence of the carbonization temperature on the mechanical properties of thermoplastic polymer derived C/C—SiC composites is investigated. It is further disclosed that following the carbonization, the composites are infiltrated with liquid silicon.

SUMMARY OF THE INVENTION

It is an object of the present invention to provide a method for producing a CMC-component which can have a comparatively complex three-dimensional structure and/or surface, but which nevertheless has a high structural robustness.

In order to achieve this object, the present invention provides a method for producing a CMC-component comprising at least the steps of
 pyrolizing a green body made of a fiber-reinforced thermoplastic material; and
 infiltrating the pyrolized green body by a liquid carbide forming substance, in particular by liquid silicon or by a liquid silicon alloy.

The fibers of the green body are arranged in one or several strands, each of these strands having a main extension direction. The lengths of the fibers of each strand are larger than the overall length of the green body along the main extension direction of this strand.

The green body forms the raw component for carrying out the inventive method and can particularly be produced in accordance to the method as disclosed in DE 44 45 305, the entire content of which is hereby incorporated by reference. Thus, the green body can be regarded as an intermediate product in the production of the CMC-component. The green body, however, can also be represented by a component that has originally been intended to form a final component by itself for being used in various applications. The green body is preferably produced by means of flow-pressing, in particular push- and/or pull-extruding, the fiber-reinforced thermoplastic material. In doing so, a molten and fiber-reinforced thermoplastic material is pressed into a mold, in order to adopt the desired shape of the green body. In the process of flow-pressing, the fibers which are embedded in the thermoplastic material preferably leave the extruder in an unidirectional way, in order to be automatically aligned in the mold such as to follow at least partly the outer shape of the mold and, thus, of the green body. Alternatively, the green body can also be produced by e.g. a pultruding process. Continuous fibers are preferably used for producing the green body.

By being longer than the overall length of the green body along the main extension direction of the respective fiber strand, the individual fibers necessarily comprise one or several curves and are usually also entangled in each other. As a consequence, the fibers not only improve the structural stability of the green body and thus of the final CMC-component along the main extension direction of their respective strand, but also along other directions. Furthermore, with such an arrangement of the fibers, it is easily possible to produce components having a comparatively complex three-dimensional structure. Fine surface features, such as threads, can be provided and be reinforced by the strands.

In order to achieve good results with regard to the structural stability of the CMC-component, the fibers are preferably longer than the green body along the main extension direction of the respective strand by a factor of 1.2 to 4, more preferably 1.2 to 2.5 and most preferably 1.2 to 1.8. Of course, further fibers can be present in the green body, which are shorter than the strands and/or which are not even part of a strand. Such further fibers can be advantageous e.g. to improve the strength of the CMC-component along a direction that stands perpendicular to the main extension directions of a strand.

The method for producing a CMC-component is preferably a near net shape production method, meaning that the final CMC-component essentially has the same form as the green body with respect to both shape and dimension. The arrangement of the fibers within the component is preferably also essentially the same for both the green body and the final CMC-component. During the production, the lengths of the fibers preferably remain essentially unchanged until completion of the CMC-component. As a result, the fibers are present in the CMC-component in the same way as in the green body and act in the same way to reinforce the CMC-component as the green body.

A strand is considered to represent a bundle of fibers which all have the same main extension direction. A strand of fibers is usually used to reinforce a certain part of the component or the entire component, in particular along the main extension direction of the strand, but also along other directions. The individual fibers of a strand are usually longer than the overall length of the strand along its main extension direction.

In a particularly preferred embodiment, the lengths of all fibers are larger than the maximal overall length of the green body. In order to simplify the production process of the green body, no further fibers are present in the green body, that are shorter than the maximal overall length of the green body.

During the pyrolysis, the thermoplastic material of the green body is carbonized, in order to at least partly react to carbide during the infiltration of the liquid carbide forming substance later on. The pyrolysis is preferably carried out in an inert atmosphere, e.g. in the presence of argon or nitrogen. In order to counteract the thermal expansion of the thermoplastic material and, thus, to maintain the shape of the green body, the green body is preferably located in a mold during the pyrolysis.

For the infiltration, preferably liquid silicon (Si) is used as the liquid carbide forming substance, in order to at least partly react to silicon carbide. It is also possible to use a liquid silicon alloy for the infiltration, in order to at least partly react to silicon carbide and possible other carbides. In case of a liquid silicon alloy, the silicon is preferably alloyed with a metal, such as in particular with an element out of the group of titanium (Ti), zirconium (Zr), molybdenum (Mo) and hafnium (Hf), or a mixture thereof.

As an alternative, it is also possible to use as the liquid carbide forming substance an element out of the group of titanium (Ti), zirconium (Zr), molybdenum (Mo) and hafnium (Hf). In this respect, it is possible to use one of these elements Ti, Zr, Mo and Hf alone or a mixture thereof. The elements Ti, Zr, Mo and Hf or the mixture thereof can be alloyed with silicon.

The carbide formed due to the infiltration with the carbide forming substance preferably has a hardness suited for the component to be used as a (mechanical) fastening component, a turbine blade, a nozzle or a toothed gear. The carbide can particularly be silicon carbide and/or a metallic carbide.

The fibers are advantageously arranged such in the green body, that they at least partly follow the three-dimensional outer shape of the green body. Thus, preferably at least some of the fibers follow the three-dimensional outer shape of the green body along at least a part of their overall extension. Thus, the fibers advantageously reflect the outer three-dimensional shape of the green body by means of their extensions and arrangement. By following the outer shape of the green body, the fibers optimally reinforce the green body and, as a consequence, the final CMC-component in the surface regions.

In order to further improve the structural robustness of the CMC-component, the fibers of each strand are advantageously at least partly entangled in each other.

The thermoplastic material of the green body is preferably polyether ether ketone (PEEK). The fibers are preferably made of carbon and/or, in order to achieve a higher temperature resistance, of silicon carbide. The fibers can be coated fibers. In certain preferred embodiments, no further materials, in particular no binder resins or the like, are present or are added to the green body prior and/or during the pyrolysis. In other, also preferred embodiments, a first pyrolysis is carried out and the pyrolyzed green body is then infiltrated with a polymer, e.g. a phenolic resin, before a second pyrolysis is carried out, which can then be followed by an arbitrary number of further cycles of polymer-infiltration and subsequent re-pyrolysis.

The green body is preferably made as a whole in one piece. Advantageously, the green body is produced directly as a whole, meaning that e.g. no separate parts exist which are produced individually and are then joined together to form the green body. With a production of the green body directly as a whole, no abrupt transitions exist within the green body as concerns the fibers and/or the properties of the thermoplastic material.

The content of the fibers in the fiber-reinforced thermoplastic material of the green body is advantageously in the region of 20-70 vol %, in particular 40-60 vol %. The fibers are advantageously regularly distributed in the green body, meaning that the fiber content is approximately the same throughout all regions of the green body.

In order to reduce the wettability of the pyrolyzed component and thus to reduce the formation of residual molten carbide forming substance, e.g. silicon, on the surface of the component and in particular on surface parts of the component comprising fine features, such as a thread, boron nitride can be applied to at least a part of the pyrolyzed component prior to the infiltration with the liquid carbide forming substance.

The present invention also refers to a CMC-component produced according to the method as described above. The CMC-component can be a turbine blade, a nozzle, a toothed gear or a fastening component, in particular a screw, a screw nut, a bolt, a pin or a rivet. The CMC-component produced in accordance with the described method can particularly be adapted to be used in medical technology, in aerospace, in nuclear power plants or in fusion reactors.

SHORT DESCRIPTION OF THE FIGURES

Figure 2:
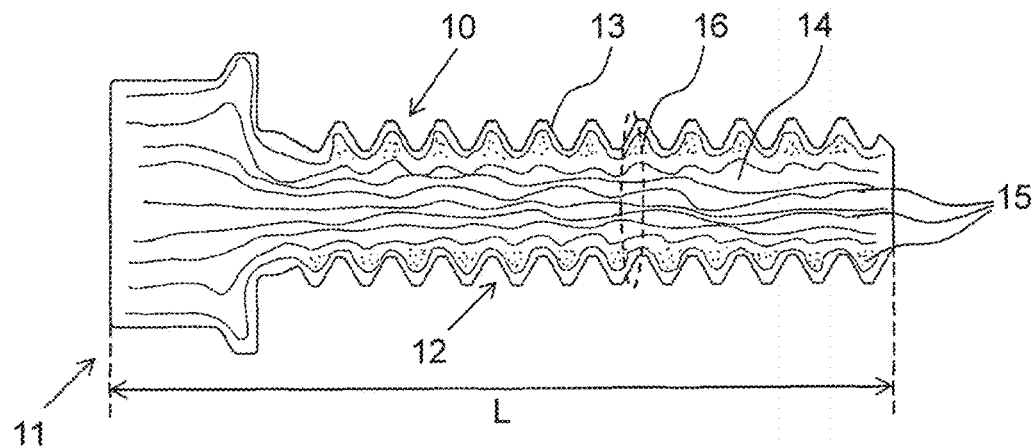
Figure 3:
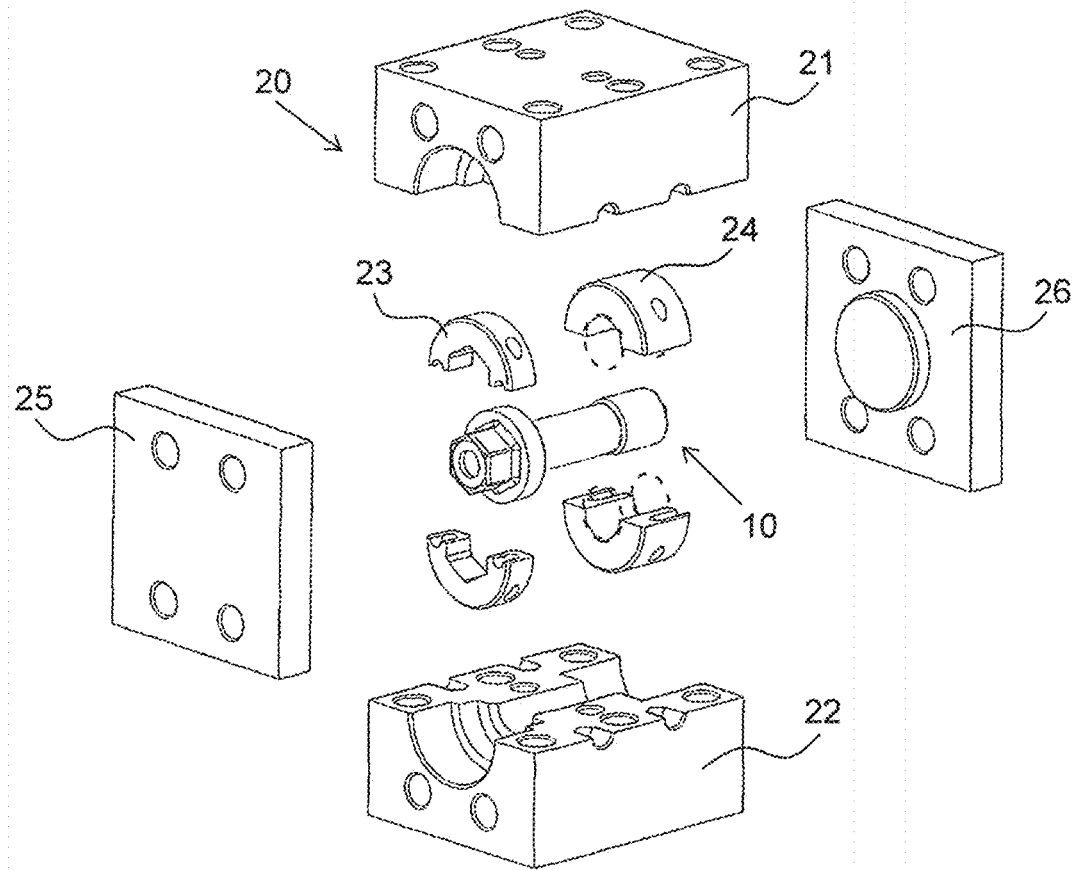
Figure 4:
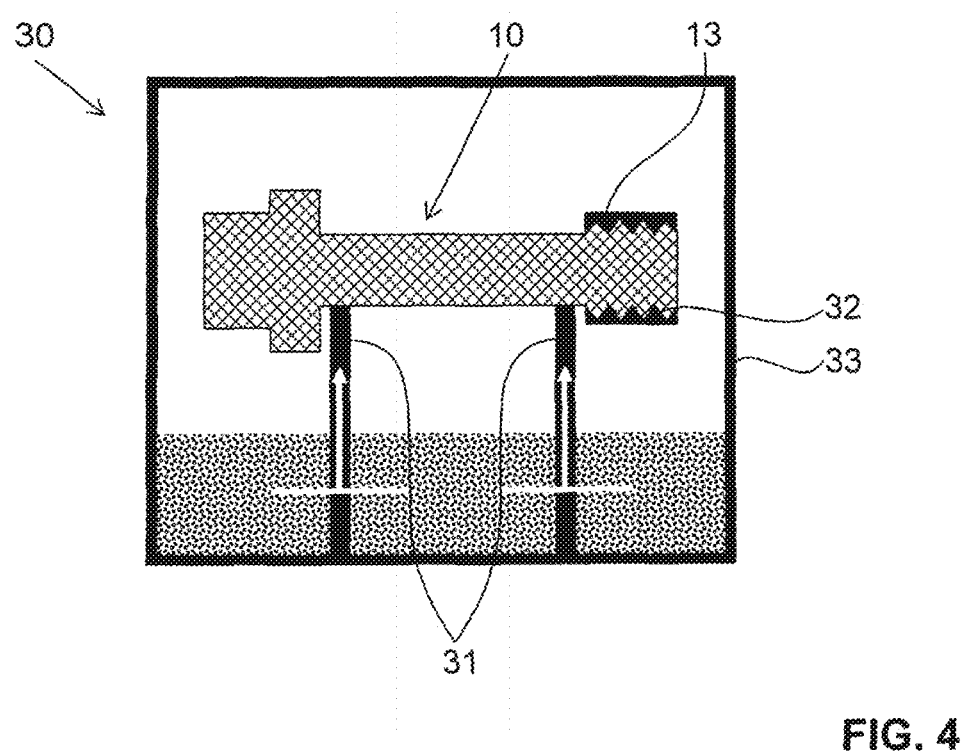

Preferred embodiments of the invention are described in the following with reference to the drawings, which only serve for illustration purposes, but have no limiting effects. In the drawings it is shown:

FIG. 1 a flow chart of a preferred embodiment of the method according to the invention for producing a CMC-component;

FIG. 2 a schematic cross-section view of a green body used in the method according to the invention, with the fiber arrangement within the green body being visualized;

FIG. 3 a perspective explosion view of the mold with inserted green body during the pyrolization process; and FIG. 4 a schematic cross-section view of the infiltration device with inserted pyrolized green body during the liquid silicon infiltration.

DESCRIPTION OF PREFERRED EMBODIMENTS

FIG. 1 shows a flow chart that illustrates a preferred embodiment of an inventive method for producing a CMC-component.

For carrying out the inventive method for producing a CMC-component 6, a green body 1 is used as a raw component. The green body 1 is made of a fiber-reinforced thermoplastic material and can particularly be produced in accordance with the method as disclosed by DE 44 45 305.

FIG. 2 illustrates an exemplary embodiment of such a green body 1 in the form of a screw 10. The screw 10 has a head 11 and a shaft 12. The shaft 12 comprises a thread 13 that defines a large part of the outer surface of the shaft 12. Due to the thread 13, the outer surface of the shaft 12 comprises local elevations and depressions which are essential for the function of the screw. A high structural robustness is particularly crucial in the region of these local elevations and depressions of the thread 13.

The green body 10 is made of a thermoplastic material 14 which is preferably polyether ether ketone (PEEK). In a concrete embodiment, the material Victrex™ PEEK 150 was used as the thermoplastic material 14. Further materials are possible for the thermoplastic material 14, especially from the polymer family Polyaryletherketones (PAEK) such as e.g. Polyetherketones (PEK), Polyetherketoneketone (PEKK) etc. or other so called high performance thermoplastics such as e.g. Polyetherimides (PEI), Polyethersulfones (PESU), Polysulfones (PSU), Thermoplastic Polyimides (TPI) etc.

In the thermoplastic material 14, fibers 15 are embedded. The fibers 15 can particularly be carbon fibers or silicon carbide fibers. In a concrete embodiment, the product Hex-Tow® Continuous Carbon Fiber IM7 was used for the fibers 15. As an alternative, e.g. the product Tyranno Fiber® could be used likewise for the fibers 15.

As can be seen in FIG. 2, all fibers 15 are longer than the maximal overall length L of the screw 10. In the present case of a screw, the maximal overall length L of the screw 10 is measured along the central longitudinal axis extending along the longitudinal extension of the shaft 12. The lengths of the fibers 15 are larger than the maximal overall length L of the screw 10, because the extensions of the individual fibers 15 are not straight and in parallel with respect to each other. On the contrary, each of the fibers 15 is curved several times along of its main extension direction. The fibers 15 are also at least partly entangled/intermingled in each other. At the same time, all of the fibers 15 extend along an essentially same main direction which is directed in parallel to the central longitudinal axis of the screw 10 and in particular of its shaft 12. Due to this curved and entangled arrangement of the fibers 15, while still extending along the same main direction, a particularly high structural robustness of the screw 10 (and of the final CMC-component 6) can be achieved not only along the common main direction of the fibers 15, but also in all other directions.

It can also be seen in FIG. 2 that in the region of the thread 13, i.e. in the region close to the outer lateral surface of the shaft 12, the fibers 15 follow the elevations and depressions that are formed by the thread 13. In a particularly preferred embodiment, the fibers 15 even form spirals in the region of the thread 13 and in particular in the regions of the elevations of the thread 13, such as to follow the spiral shape of the continuous elevation formed by thread 13. The respective fibers 15 are visualized in FIG. 2 by means of dots in the region of thread 13, due to their extension through the cross-sectional plane of sight of FIG. 2. In the region of screw head 11, the fibers 15, in particular the fibers 15 which are arranged near the lateral surface of the screw 10, follow the outer shape of the head 11, which substantially enhances the structural stability of the head 11.

The fibers 15 together form a strand 16 that has a main direction extending along the central longitudinal axis of the screw 10. Different than in the current embodiment of a screw, several strands of fibers can be present in other embodiments, with each strand extending along a different main direction. The fibers 15 of each strand 16 essentially extend along the same main direction, but are curved several times and at least partly entangled in each other. As a result, each strand 16 improves the structural stability of the screw 10 (and of the final CMC-component 6) mainly along its main extension direction, but also along all other directions.

For producing a CMC-component, the green body 1, 10 is pyrolized as shown under step 2 of FIG. 1. The pyrolization is carried out within a mold 20, as shown in FIG. 3, in order to counteract the thermal expansion of the thermoplastic material 14 and to maintain the shape of the green body 1, 10. Thus, the mold 20 is used to keep the original shape of the green body 1, 10 and particularly to preserve functionally crucial surface structures, such as the thread 13 of the screw 10.

The mold 20 used in FIG. 3 comprises a first mold body 21 and a second mold body 22. In the current embodiment, the mold 20 also comprises a head insert 23 and a thread insert 24 which have an inner surface that forms the negative of the head 11 and of thread 13 of screw 10, respectively. Both the head insert 23 and the thread insert 24 have an upper and a lower part. By using inserts 23, 24, the design of the head 11 and of the thread 13 can easily be varied by means simply exchanging the inserts 23, 24 with corresponding different inserts.

Towards the sides, the mold 20 can be closed and held together by means of a first front plate 25 and a second front plate 26. In the closed state of the mold 20, the first and second mold bodies 21, 22, together with the upper and lower parts of each of the head insert 23 and of the thread insert 24 and together with the first and second front plates 25, 26, form an inner cavity for receiving the screw 10. The cavity forms an almost exact negative of the screw 10 and, thus, constrains the outer shape of the screw 10 during pyrolysis.

The mold 20 is designed such as to assure certain production tolerances with regard to the final CMC-component 6. For example, the mold 20 can have a maximal over-sizing of 0.02-0.05 mm with respect to the nominal dimensions of the outer features (e.g. the elevations formed by thread 13) of the final CMC-component 6. Respectively, a maximal under-sizing of 0.02-0.05 mm can for example be provided with respect to the inner features (e.g. the depressions formed by thread 13) of the final CMC-component 6.

The mold 20 should preferably be made of a hot work tool steel suitable for cyclic exposure to severe thermal conditions. In a concrete embodiment, AISI 1.2343 was used as the steel material for the mold 20.

All the surfaces of the mold 20 that come in direct contact with the green body 1, 10 to be pyrolized preferably have a roughness of Ra 0.4 μm or finer. The construction of the mold 20 should guarantee that after pyrolysis, no significant mechanical stresses act on the screw 10 when removing it from the mold 20. The design of mold 20 should ensure a tight joining of the mold parts 21-26 during the whole pyrolization process 2. The mold design and the mold material should ensure that the mold 20 maintains its shape during the whole pyrolization process 2, according to the shape tolerances of the final CMC-component 6. It is usually not necessary for the mold 20 to be gas tight, but it should preferably be guaranteed that no solids or fluids are able to leach from the mold 20 during the pyrolysis 2.

The pyrolysis 2 is performed in an inert atmosphere—e.g. flowing (100 nl/min) of Argon or Nitrogen. Good results were achieved when applying a heating rate from room temperature up to e.g. 1000° C. that was in the region from 10° C./h to 60° C./h. The temperature can then be further increased to e.g. up to 1600-1800° C.

During pyrolysis 2, the gases produced by the decomposition of the thermoplastic material 14, e.g. of a PEEK matrix, are preferably allowed to escape from the screw 10 and through the mold 20, e.g. through the interfaces between the individual mold parts 21-26.

After carrying out the pyrolysis 2, a boron nitride coating 3 is optionally, but preferably, applied prior to the step of liquid silicon infiltration 4 (see FIG. 1). The step of boron nitride coating serves to reduce the wettability of e.g. functionally crucial parts of the surface of the pyrolized green body 1, 10 with respect to molten silicon. Such a crucial surface part can for example be the region of the thread 13 of a screw 12. The boron nitride coating 3 substantially reduces the need for carrying out post processing and finishing operations with respect to the respective surface parts. By reducing the wettability of the respective surface parts, the formation of residual molten silicon on the component as a result of the step of liquid silicon infiltration 4 can be reduced significantly. For this purpose, for example the shaft 12 of the pyrolized screw 10 can be dip coated in a water based boron nitride suspension in the region of the thread 13. After appropriate drying, the component can then be infiltrated by liquid silicon as indicated under step 4 in FIG. 1.

The liquid silicon infiltration 4 is carried out, in order to transform the pyrolized thermoplastic material 14 of the screw 10 at least partly, preferably essentially completely, into silicon carbide. For this purpose, liquid silicon or a liquid silicon alloy is introduced into the component through the pores of the screw 10 that remain after the pyrolysis 2. Within the pyrolized green body 1, 10, the silicon, together with the carbon produced during the pyrolysis 2, reacts at least partly to silicon carbide and, if a silicon alloy is used for infiltration, to possible other carbides.

For the liquid silicon infiltration 4, the pyrolized screw 10 is placed in a graphite crucible 33 of an infiltration device 30 (FIG. 4). Boron nitride paint is preferably applied to the internal surfaces of the crucible 33, in order to avoid silicon infiltration of the crucible 33. Silicon flakes can then be placed on the bottom of the crucible 33. In doing so, an adequate amount of silicon is chosen to reach the desired infiltration extent.

Instead of using silicon for the infiltration of the pyrolized green body in step 4, it is basically possible to use any other carbide forming substance, such as a silicon alloy or an element out of the group of Ti, Zr, Mo and Hf alone or a mixture thereof, possibly alloyed with silicon. Thus, the use of silicon for the infiltration is to be regarded as a mere example for carrying out step 4 of the method. The example with silicon is a preferred, but certainly not exclusive example of how the infiltration of the pyrolized green body can be carried out, in order to produce a carbide or a plurality of carbides.

After this preparation of the infiltration device 30, the crucible 33 with the pyrolized screw 10 located therein is placed in a furnace for carrying out the liquid silicon infiltration 4. As already mentioned, the thread 13 of the screw 10 is preferably coated with boron nitride 32 during the liquid silicon infiltration 4. Due to the boron nitride 32, the surface structure of the screw 10 in the region of the thread 13 is preserved, while still enabling a complete infiltration. In order to obtain C—Si—SiC ceramics, the screw 10 is infiltrated with molten Si in vacuum (having a residual pressure of advantageously $10^{-2}$ mbar or less) at temperatures higher than the melting point of silicon (preferably in the region from 1450° C. to 1600° C.). The crucible 33 is brought to these temperatures by the electric furnace with an advantageously fast heating rate of e.g. 50-100° C. per minute. Once the desired temperature is reached, it is maintained for a sufficient amount of time (from few minutes up to several h for large parts) to allow the molten liquid silicon 31 to fully infiltrate the screw 10. At these temperatures, molten Si first infiltrates the porous carbon body of the screw 10 by capillarity, in order to react with it to SiC. This respective process is also known to the skilled person as Melt Infiltration (MI) or Liquid Silicon Infiltration (LSI) or Reactive Melt Infiltration (RMI). Carbon wicks, usually made by rigid carbon felts or by pyrolyzed wood, can be placed between the pyrolized component and the crucible 33, in order to drain excess molten silicon 31.

After the liquid silicon infiltration 4, post processing 5 is carried out, in order to yield the final CMC-component 6 (FIG. 1). Due to excess silicon left on the surface of the component after the liquid silicon infiltration 4, post-processing 5 is usually necessary. In order to achieve the final shape of the CMC-component within the required production tolerances, different procedures can be applied singularly or combined with each other. Examples of such post-processing procedures are grinding, chemical etching, tumble finishing and liquid silicon desorption. Each of these procedures is well-known to the skilled person.

In the case of chemical etching, in particular etching of silicon according to the following reaction can be applied: $3Si+12HF+4HNO_3=8H_2O+4NO+3SiF_4$. Such a chemical etching can particularly be applied to functionally crucial parts of the component, such as the region of the thread 13 of the screw 10. For example, a mixture of hydrofluoric and nitric acids with a ratio of approx. 3:1 can be applied at 100° C. for 24 hours, with continuous mixing.

In the case of tumble finishing, the component, in order remove excess silicon, can for example be placed into a High-Density Polyethylene (HDPE) jar half filled with silicon carbide coarse powder as grinding media, grit FEPA 36-100, and be shaked in a Turbula®-mixer for 8 hours, with a mixer speed set to 100 $min^{-1}$.

For the liquid silicon desorption, excess silicon can be removed by re-melting the silicon and draining it away from the component. For this purpose, the component can be placed in a graphite powder bed and heated up to the silicon melting temperature. The molten silicon then flows into the graphite powder bed, driven by capillary action.

After completing the post-processing 5, the final CMC-component 6 is obtained (FIG. 1). The outer shape of the final CMC-component 6 is the same as the one of the green body 1. Also the arrangement of the fibers 15 within the component remains unchanged during the entire production from the green body 1 to the final CMC-component 6. Thus, the inventive method is a near net shape production method. In the example of the production of a screw 10 as set out above, the shape and the fiber arrangement of the finally obtained screw after carrying out each of steps 2-5 corresponds to the shape and fiber arrangement of the screw 10 as shown in FIG. 2.

The final CMC-component 6 has advantageous properties, such as in particular high-temperature stability, high thermal shock resistance, high hardness, high corrosion resistance and lightweight. At the same time, it can have a comparatively complex three-dimensional shape and/or comprise small surface features, such as a thread 13. With these properties and its resistance to radiation, the final CMC-component 6 is particularly suited for use in aerospace, in medical technology, in nuclear power plants or in fusion reactors. The final CMC-component 6 can for example be a foil, a blade, a nut, a bolt, a rivet or a shaped connecting plate.

The invention claimed is:

1. A method for producing a CMC-component comprising at least the steps of
pyrolizing a green body made of a fiber-reinforced thermoplastic material; and
infiltrating the pyrolyzed green body by a liquid carbide forming substance;
wherein the fibers of the green body are arranged in one or several strands, each of these strands having a main extension direction,
wherein the fibers are arranged such in the green body, that they at least partly follow the three-dimensional outer shape of the green body and/or wherein the fibers of each strand are at least partly entangled in each other,
wherein the lengths of the fibers of each strand are larger than the overall length of the green body along the main extension direction of this strand by a factor of 1.2 to 4,
and wherein the method is a near net shape production method, in which the shape of the green body is maintained by locating the green body in a mold during pyrolysis, in order to counteract the thermal expansion of the thermoplastic material.

2. The method according to claim 1, wherein the lengths of all fibers are larger than the maximal overall length of the green body.

3. The method according to claim 1, wherein the pyrolizing is carried out in an inert atmosphere.

4. The method according to claim 1, wherein the lengths of the fibers remain essentially unchanged until completion of the CMC-component.

5. The method according to claim 1, wherein the thermoplastic material of the green body is polyether ether ketone (PEEK).

6. The method according to claim 1, wherein the fibers are made of carbon or of silicon carbide.

7. The method according to claim 1, wherein the fibers are coated.

8. The method according to claim 1, wherein the green body is produced by means of flow-pressing, the fiber-reinforced thermoplastic material.

9. The method according to claim 1, wherein the content of the fibers in the fiber-reinforced thermoplastic material of the green body is in the region of 20-70 vol %.

10. The method according to claim 1, wherein boron nitride is applied to at least a part of the pyrolyzed green body prior to the infiltration with the carbide forming substance.

11. The method according to claim 8, wherein the green body is produced by means of push- and/or pull-extruding the fiber-reinforced thermoplastic material.

12. The method according to claim 9, wherein the content of the fibers in the fiber-reinforced thermoplastic material of the green body is in the region of 40-60 vol %.

13. A CMC-component obtained by pyrolizing a green body made of a fiber-reinforced thermoplastic material and infiltrating the pyrolyzed green body by a liquid carbide forming substance,
wherein the fibers of the green body are arranged in one or several strands, each of these strands having a main extension direction,
wherein the fibers are arranged such in the CMC-component, that they at least partly follow the three-dimensional outer shape of the CMC-component and/or wherein the fibers of each strand are at least partly entangled in each other,
and wherein the lengths of the fibers of each strand are larger than the overall length of the green body along the main extension direction of this strand by a factor of 1.2 to 4.

14. The CMC-component according to claim 13, wherein the CMC-component is a turbine blade, a nozzle, a toothed gear or a fastening component.

15. The CMC-component according to claim 13, wherein the CMC-component is adapted to be used in medical technology, in aerospace, in nuclear power plants or in fusion reactors.

16. The CMC-component according to claim 14, wherein the CMC-component is a fastening component in the form of a screw, a screw nut, a bolt, a pin or a rivet.

* * * * *